(12) United States Patent
Thakur et al.

(10) Patent No.: US 8,667,406 B1
(45) Date of Patent: Mar. 4, 2014

(54) ARTBOARD CREATION AND PREVIEW

(75) Inventors: Anand Thakur, Haryana (IN); Manoj Gupta, Uttarachancal (IN); Manoj Singh Karki, Uttar Pradesh (IN); Pushp Parag Agarwal, Rajasthan (IN)

(73) Assignee: Adobe Systems Incorporated, San Jose, CA (US)

( * ) Notice: Subject to any disclaimer, the term of this patent is extended or adjusted under 35 U.S.C. 154(b) by 856 days.

(21) Appl. No.: 12/243,366

(22) Filed: Oct. 1, 2008

(51) Int. Cl.
*G06F 3/048* (2013.01)

(52) U.S. Cl.
USPC .......................................... 715/764; 715/815

(58) Field of Classification Search
USPC .................................................. 715/764, 815
See application file for complete search history.

(56) References Cited

U.S. PATENT DOCUMENTS

| | | | |
|---|---|---|---|
| 6,262,728 B1 * | 7/2001 | Alexander | 345/440.1 |
| 6,515,682 B1 | 2/2003 | Washington et al. | |
| 6,731,309 B1 | 5/2004 | Unbedacht et al. | |
| 7,231,602 B1 | 6/2007 | Truelove et al. | |
| 7,423,655 B1 * | 9/2008 | Stephens | 345/624 |
| 7,511,720 B2 * | 3/2009 | Ayers et al. | 345/629 |
| 7,739,613 B2 * | 6/2010 | Lindsay | 715/768 |
| 2003/0160824 A1 * | 8/2003 | Szumla | 345/769 |
| 2004/0261012 A1 * | 12/2004 | Balsiger | 715/508 |
| 2005/0068290 A1 * | 3/2005 | Jaeger | 345/156 |
| 2005/0198571 A1 * | 9/2005 | Kramer et al. | 715/517 |
| 2006/0248480 A1 | 11/2006 | Faraday et al. | |
| 2008/0028323 A1 * | 1/2008 | Rosen et al. | 715/752 |
| 2008/0115074 A1 * | 5/2008 | Lindsay | 715/768 |
| 2008/0301547 A1 * | 12/2008 | Karunakaran et al. | 715/244 |
| 2009/0128483 A1 * | 5/2009 | Robbins et al. | 345/156 |

OTHER PUBLICATIONS

Microsoft Word 2007. Screenshots of running program. Copyright 2006.*
Microsoft Office 2007. Screen shot of running program. 2006.*
Chapter 1,"Getting to Know Microsoft Office 2007", pp. 20.

* cited by examiner

*Primary Examiner* — Omar Abdul-Ali
*Assistant Examiner* — Haimei Jiang
(74) *Attorney, Agent, or Firm* — Kilpatrick Townsend & Stockton LLP

(57) ABSTRACT

Methods and apparatus provide for an artboard generator that detects a selection to create a new artboard on a digital canvas. The artboard generator provides a transparent rendition of the new artboard on the digital canvas and performs a placement operation of the new artboard. Upon completion of the placement operation, the artboard generator converts the transparent rendition of the new artboard to an opaque rendition of the new artboard. The artboard generator detects a selection to create a second new artboard. The artboard generator defines characteristics of the second new artboard in accordance with characteristics of the resized new artboard. The artboard generator provides a transparent rendition of the second new artboard and performs a placement operation of the second new artboard. Upon completion of the placement operation, the artboard generator converts the second new artboard from a transparent rendition to an opaque rendition.

29 Claims, 10 Drawing Sheets

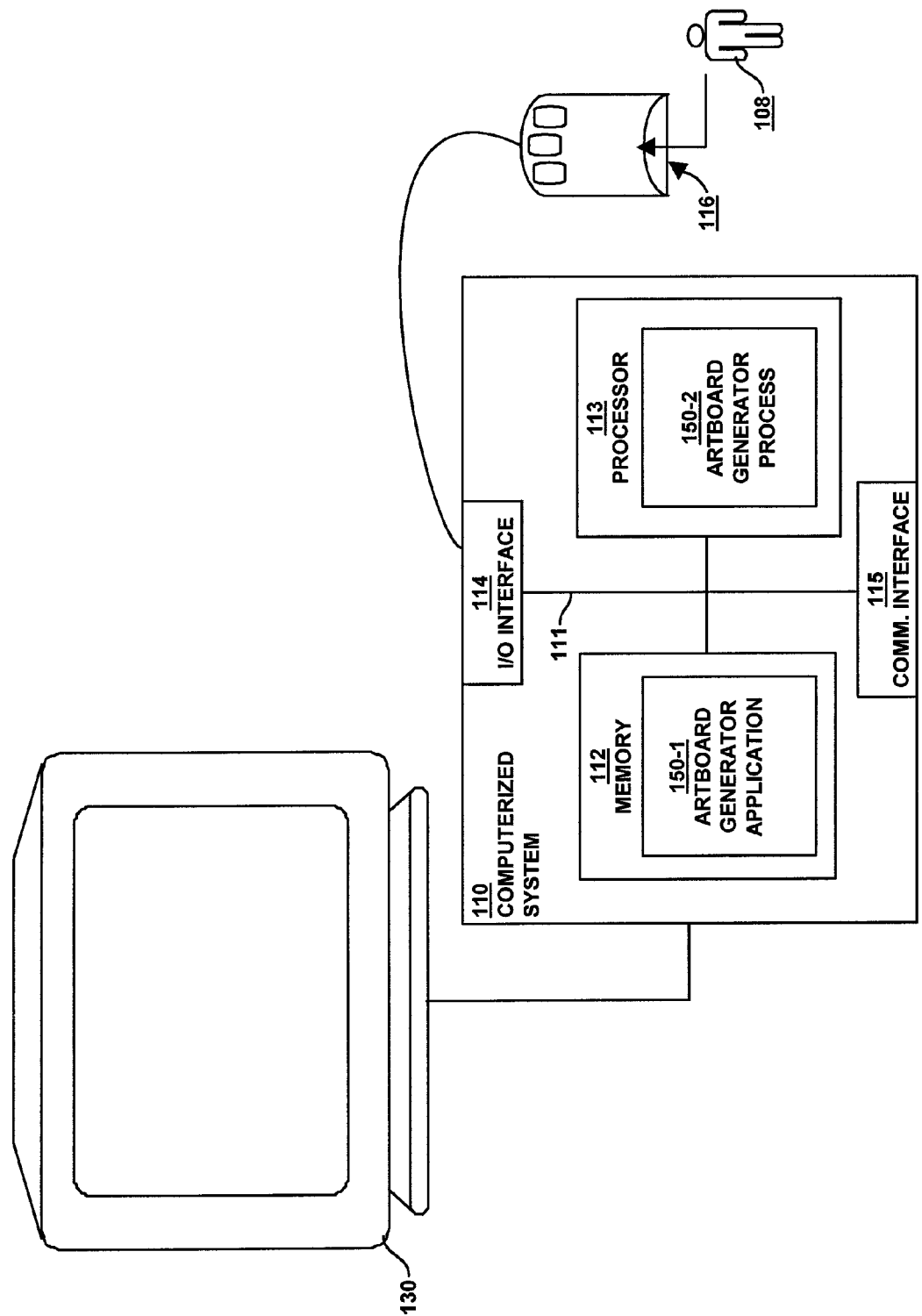

ARTBOARD CREATION AND PREVIEW

BACKGROUND

Conventional computerized devices, such as personal computers, laptop computers, and the like utilize graphical user interfaces in applications such as operating systems and graphical editors (i.e., web page editors, document editors, image editors, etc.) that enable users to quickly provide input and create documents and/or projects using "What You See Is What You Get" (WYSIWYG) technology. In general, using a graphical user interface, a user operates an input device such as a mouse or keyboard to manipulate graphical objects on a computer display. The graphical objects are often represented as icons, windows, lines, shapes, etc., and the user can operate an input device such as a mouse to move a mouse pointer onto an icon (i.e., graphically overlapping the icon) on the graphical user interface. By depressing a mouse button, the application, such as the operating system desktop, selects the icon, and if the user maintains the mouse button in a depressed state, the user can drag the icon across the graphical user interface. By releasing the mouse button, the icon is placed on the graphical user interface at the current position of the mouse pointer.

Many conventional graphical editors provide a work area on which graphical editing is performed. The work area, more commonly known as a 'canvas', is a window within the graphical user interface in which the graphical editing is performed (for example, an image is created or edited, etc.). Essentially, the work area, or digital canvas, is the on screen counterpart of a cloth canvas that an artist can use to create a painting, artwork or other type of drawing.

BRIEF DESCRIPTION

Current conventional software systems for creation of work areas within an electronic canvas suffer from a variety of deficiencies. Specifically, using a conventional software application, when a user creates (or opens) a new document or project such as a new drawing, the conventional software systems create the new document (e.g. a new drawing area within a canvas) according to default characteristics. If the user wants the new document to have different characteristics (such as different dimensions), the user must take the time to resize or otherwise adjust the new document's characteristics after it has already been created. In addition, the user has no control over the initial position of the new document with respect to other documents associated with the same project. That is, when conventional systems create the new document, the conventional systems place the new document at a default position in the project which is usually reserved for the most recently created document.

If the user wants to create a new document that has all the characteristics of an existing document in the user's project, most conventional systems allow the user to copy the existing document. Thus, conventional systems create the new document as a second instance of the existing document. However, since the new document is a complete copy of the existing document, the conventional systems create the new document with all the characteristics of the existing document. This means that the conventional system copies content from the existing document to the new document. If the user wants the new document to ultimately have different content than the existing document, the user must spend time deleting the existing document's content that is displayed in the new document.

Techniques discussed herein significantly overcome the deficiencies of conventional applications such as those discussed above. As will be discussed further, certain specific embodiments herein are directed to an artboard generator that creates new artboards in a digital canvas. Instead of creating each new artboard according to default characteristics, the artboard generator defines the new artboard according to the characteristics of an active artboard already present in the digital canvas. However, while the new artboard inherits the characteristics—such as dimensions—of the active artboard, the artboard generator does not create the new artboard as including any of the content present in the active artboard. In other words, the new artboard displayed on the digital canvas is a blank artboard. In addition, according to one embodiment, when the artboard generator creates the new artboard, the artboard generator allows the user to select the new artboard's initial position on the digital canvas.

Thus, in contrast with conventional systems, initial characteristics of a new artboard are based on the characteristics of an active artboard displayed in the digital canvas rather than a standard set of default characteristics.

In further embodiments, the artboard generator avoids assigning a new artboard to an initial position in the digital canvas and allows the user to choose where the new artboard will be placed with respect to any other artboards already present in the digital canvas.

For example, the artboard generator presents a user interface with a digital canvas that already has multiple artboards present in the digital canvas—each artboard includes retained content specific to the artboard. The artboard in which the user is currently working on—or most recently modified—is considered to be an "active" artboard. Special highlighting may be used to indicate one or more active artboards versus one or more other artboards on the digital canvas that are inactive. The user selects an option to create a new artboard to be placed on the digital canvas. The artboard generator detects the user's selection and provides a transparent rendition of the new artboard at either an arbitrary location in the user interface or a location that corresponds with a location of a user-controlled prompt (i.e. a mouse pointer). The artboard generator defines characteristics (such as dimensions) of the new artboard based on the characteristics of the "active" artboard. Thus, the new artboard inherits the characteristics of the "active" artboard. However, the transparent rendition of the new artboard does not include any content retained in the "active" artboard. Hence, the new artboard does not inherit the "active" artboard's content.

In one embodiment, the artboard generator performs a placement operation as the user selects the placement (i.e. position) of the new artboard in the digital canvas. The artboard generator performs the placement operation as the user drags the transparent rendition of the new artboard to any desired location in the digital canvas. During the placement operation, as the user drags the transparent rendition of the new artboard over an artboard already present in the digital canvas—the artboard generator detects the orientation of the transparent rendition of the new artboard over the artboard and provides a view of the underlying artboard's retained content through the transparent rendition of the new artboard.

During performance of the placement operation, when the artboard generator detects that an edge of the transparent rendition of the new artboard is in alignment with an edge of one of the artboards already present in the digital canvas, the artboard generator displays an indication of alignment—such as a temporary line connecting the two aligned edges. The artboard generator detects that the user has selected a placement of the new artboard in the digital canvas. The artboard generator detects that the transparent rendition of the artboard is positioned proximate to the position of the indication of alignment. The artboard generator pulls the transparent rendition of the new artboard towards the position described by indication of alignment such that the transparent rendition of the new artboard "snaps" into a location on the digital canvas which is in alignment with an artboard already present in the digital canvas. Upon completion of placing the newly created artboard on the digital canvas, the artboard generator terminates display of the indication of alignment.

Upon detecting that the user has completed performing the placement operation—such that the user has selected a placement of the new artboard in the digital canvas—the artboard generator converts the transparent rendition of the new artboard to an opaque rendition of the new artboard on the digital canvas. The artboard generator retains content in the new artboard as the user applies content to the opaque rendition of the new artboard.

In addition, the artboard generator detects the user's selection of new dimensions for the new artboard. The artboard generator applies the new dimensions to the opaque rendition of the new artboard to display an opaque rendition of a new resized artboard. When the user again selects the option to create a new artboard, the artboard generator detects the user's selection and provides a transparent rendition of a second new artboard at an arbitrary location in the user interface.

The artboard generator defines characteristics (such as dimensions) of the second new artboard based on the characteristics of the recently created artboard—since the recently created artboard is an "active" artboard. Thus, the second new artboard inherits the characteristics of the recently created artboard. However, the transparent rendition of the second new artboard does not include any of the content retained by the recently created artboard. As the user drags the transparent rendition of the second new artboard about the digital canvas, the artboard generator detects the user's performance of the placement operation with respect to the transparent rendition of the second new artboard.

Specifically, in various embodiments, the artboard generator detects a selection to create a new artboard on a digital canvas. The artboard generator provides a transparent rendition of the new artboard on the digital canvas and performs a placement operation of the new artboard.

In one embodiment, in response to a selection of a command to generate a new artboard, the artboard generator displays a rendition of the new artboard in a vicinity of a cursor operated by, for example, a user controlled input such as a computer mouse. The rendition of the new artboard follows the cursor such that the user can select a placement of the new artboard on the digital canvas. In one embodiment, one click of the mouse initiates creation of the new artboard. A second click of the mouse or inputted command subsequent to the first click initiates placement of the new artboard on a digital canvas at a location of the cursor at a time of the second click.

Upon completion of the placement operation, the artboard generator converts the transparent rendition of the new artboard to an opaque rendition of the new artboard.

The artboard generator can detect a selection to create a second new artboard. The artboard generator defines characteristics of the second new artboard in accordance with characteristics of the resized new artboard. The artboard generator provides a transparent rendition of the second new artboard and performs a placement operation of the second new artboard. Upon completion of the placement operation, the artboard generator converts the second new artboard from a transparent rendition to an opaque rendition.

In another embodiment, when a user clicks on an "Add New Artboard" option provided in a menu of the artboard generator's user interface, the artboard generator generates a transparent rendition of a new artboard at a location corresponding to the location of a user-controlled prompt (i.e. mouse pointer) manipulated by the user. The artboard generator performs placement operations as the user drags the transparent rendition of the new artboard to a chosen location in the digital canvas.

As the user drags the transparent rendition of the new artboard (and the artboard generator performs placement operations in response to the user's "dragging"), the artboard generator detects that the user has selected a location for the new artboard by detecting that the user has clicked a mouse button. Upon detecting the mouse button click, the artboard generator creates an opaque artboard at the location where the user's mouse button click occurred.

In yet another embodiment, as the user drags the transparent rendition of the new artboard, the artboard generator detects that the user has selected a location for the new artboard by detecting that the user has clicked a mouse button while pressing a modifier key (e.g. ALT key, CTRL key). Upon detecting the mouse button click and pressed modifier key, the artboard generator creates an opaque artboard at that location where the user's mouse button click occurred but the artboard generator also generates another transparent rendition of a new rendition with the same characteristics as the opaque artboard that was just recently created. By pressing the modifier key, the user does not have to choose the "Add New Artboard" option provided in the menu every time the user desires to create a new artboard.

It is understood that an artboard can be an object or window for retaining content, such as user-generated content, that can be moved around (i.e. dragged) and placed anywhere on a digital canvas in a user interface created by the artboard generator. When multiple artboards are present in the digital canvas, the multiple artboards are associated with the same project, but each of the multiple artboards can be edited and modified individually. The editing features, tools, and settings provided via the digital canvas can be applied to each of the multiple artboards. Further, the multiple artboards can be arranged in the digital canvas according to an order desired by the user.

In accordance with further embodiments, the artboard generator maintains first dimension information specifying dimensions associated with a first artboard displayed on the digital canvas. The artboard generator maintains second dimension information specifying dimensions associated with a second artboard displayed on the digital canvas. In response to receiving a command to modify a size of the second artboard, the artboard generator updates a size of the second artboard in accordance with dimensions as specified by the command and updates the second dimension information based on the dimensions as specified by the command. Thus, the maintained dimension information can keep track of a current sizing of the artboards on the digital canvas.

In yet further embodiments, in response to receiving input to create a third artboard for display on the digital canvas, the artboard generator checks the digital canvas to detect which of the artboards is active. Assume in this example that the artboard generator detects that the second artboard as mentioned above is the active artboard amongst multiple artboards displayed on the digital canvas. In such circumstances, to create the new artboard, the artboard generator accesses the second dimension information to identify a size associated with the second artboard currently displayed on the digital canvas. Based on the second dimension information, the artboard generator initiates creation of the third artboard to be substantially a same size as the updated size of the second artboard.

Accordingly, embodiments herein can include keeping track of dimensional information associated with each of multiple different sized artboard on a digital canvas. Any of the displayed artboards can be selected as a template for creating a new artboard on the digital canvas. For example, a user can select one of multiple artboards displayed on the digital canvas and thereafter initiate creation of a new artboard by inputting an appropriate command.

Thus, a general embodiment as described herein can include steps of: displaying a first artboard on a digital canvas; detecting a selection to create a second artboard for display on the digital canvas; obtaining dimension attributes associated with the first artboard; generating the second artboard based on the obtained dimension attributes; and performing a placement operation of the second artboard on the digital canvas.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium (e.g., tangible computer-readable medium) including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in software and hardware such as those manufactured by Adobe Systems Incorporated of San Jose, Calif., U.S.A., herein after referred to as "Adobe" and "Adobe Systems."

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note also that this Brief Description section herein does not specify every embodiment and/or incrementally novel aspect of the present disclosure or claimed invention. Instead, this Brief Description only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following more particular description of embodiments of the methods and apparatus for an artboard generator, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus in accordance with the invention.

FIG. 10 is an example block diagram illustrating an architecture of a computer system that executes an artboard generator application and/or an artboard generator process according to embodiments herein.

DETAILED DESCRIPTION

Figure 1:
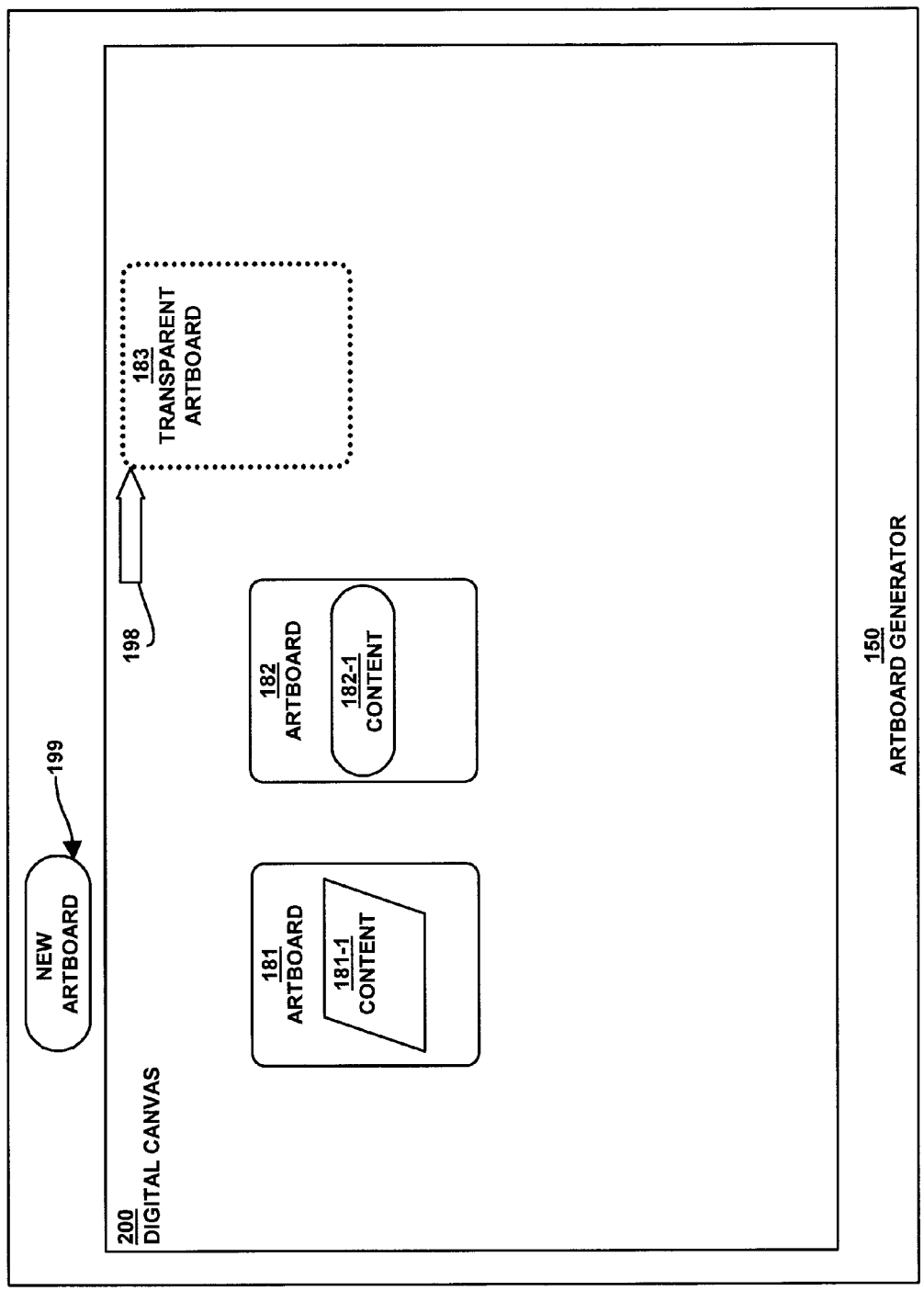
FIG. 1 is an example block diagram of an artboard generator defining dimensions of a new artboard according dimensions of an artboard in a digital canvas to embodiments herein.

FIG. 1 is an example block diagram of an artboard generator 150 defining a new artboard (e.g., 183) in a digital canvas in accordance with embodiments herein. As shown in FIG. 1, a digital canvas 200 includes two artboards 181, 182 already present in the digital canvas 200 (e.g. previously created by a user), where each of the artboards 181, 182 displays respective content 181-1, 182-1 (such as user-selected or user created or drawn content). The content 181-1, 182-1 can be text, graphics, digital image content, multimedia, a design, or the like that is retained and displayed within each artboard 181, 182.

As an example, the artboards 181 and 182 may represent respective pages of a magazine or brochure that a user of the artboard generator 150 is producing. It is understood that an "active" artboard is an artboard that a user currently (or most recently) has modified and/or edited.

In this example, after creation and addition of content to the first two artboards 181 and 182, suppose the user of digital canvas 200 wants to create a third new artboard 183. To do so, the user may select new artboard button 199.

In one embodiment, the new artboard button is a display region, dialog or other suitable selection mechanism available within the artboard generator 150. The artboard generator 150 generates the transparent artboard 183 for placement on digital canvas 200 in response to selection of the new artboard button 199. As the user moves an input mechanism such as a mouse pointer 198 over the digital canvas 200, the artboard generator 150 performs a placement operation allowing the user to place the new artboard 183 on the digital canvas 200 in accordance with the techniques described herein.

FIG. 1 displays a transparent rendition of a new artboard 183, which has yet to be dragged toward a particular final location in the digital canvas 200 by the user or other source operating mouse pointer 198. Note that display of the new artboard as a transparent rendition is shown by way of non-limiting example only and that other embodiments herein include displaying an opaque rendition of the new artboard for placement on the digital canvas 200.

Generally, the system disclosed herein allows the placement operation to provide a transparent rendition of the artboard as the user moves it about the digital canvas 200. By remaining transparent, the user is able to visually see how and where the artboard 183 being created will reside in relation to other artboards (e.g. 181, 182) already present on the digital canvas 200. Additionally, the system disclosed herein allows the artboard to be automatically aligned with other artboards 181, 182 that are currently present on the digital canvas 200. Furthermore, if the user modifies artboard characteristics such as size, future new artboards that the user creates will inherit these characteristics. Further aspects of the artboard generator 150 as disclosed herein and as illustrated in FIG. 1 are referenced below with respect to flow charts and additional figures showing other features of various embodiments.

Figure 2:
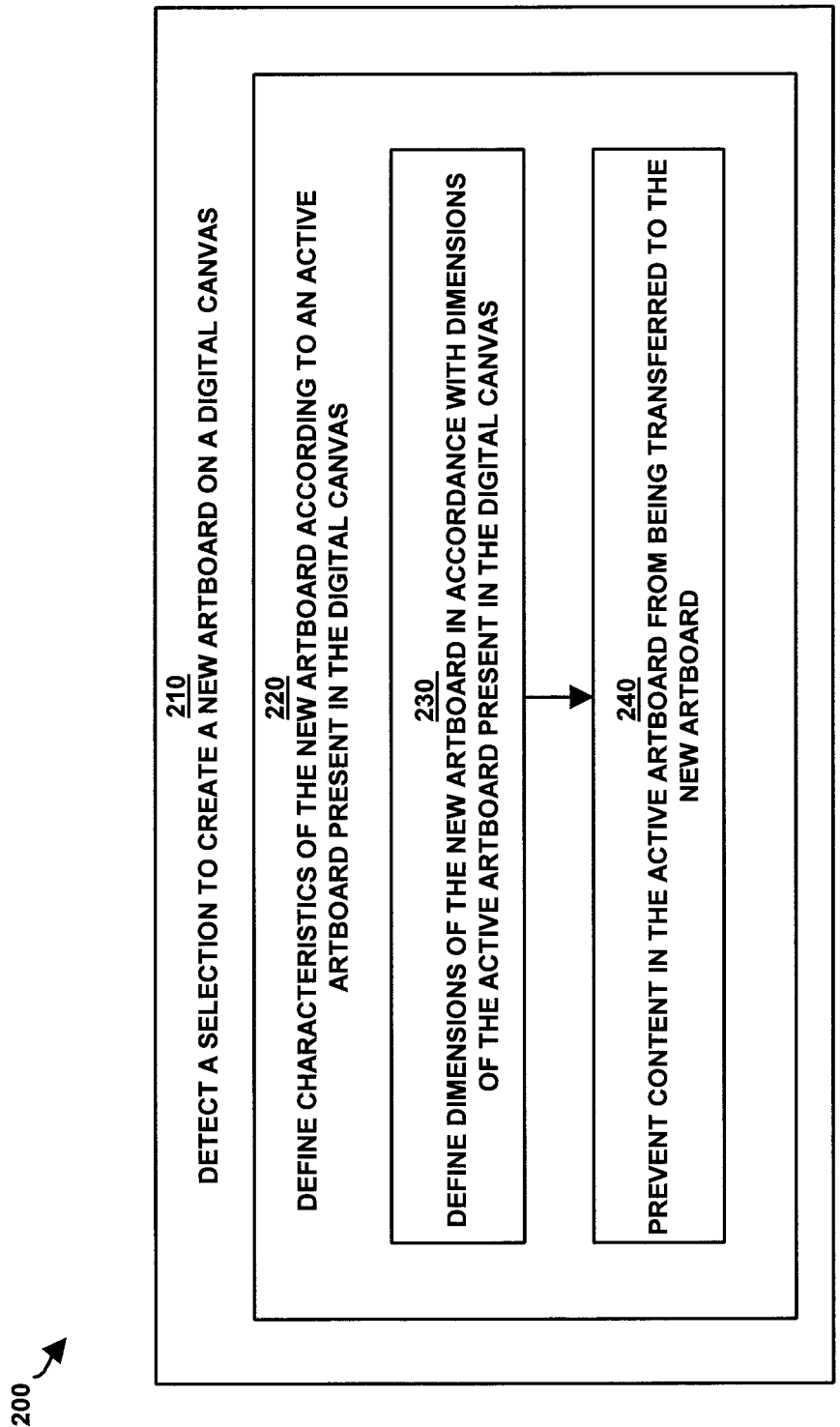
FIG. 2 is a flowchart of an example of processing steps performed by the artboard generator to define dimensions of a new artboard according dimensions of an artboard in a digital canvas according to embodiments herein.

FIG. 2 is a flowchart 200 of an example of processing steps performed by the artboard generator 150 to define dimensions of a new artboard based on dimensions of an existing artboard in a digital canvas according to embodiments herein.

At step 210, the artboard generator 150 detects a selection to create a new artboard 183 on a digital canvas 200. For example, the artboard generator 150 detects a user selecting an new artboard button 199 to create a new artboard 183. The new artboard button can be displayed in a menu associated with the digital canvas 200. As the user moves a mouse pointer 198 onto the digital canvas 200, the artboard generator 150 moves a transparent rendition of the new artboard 183 in the digital canvas 200 so that the user can select a placement of the new artboard 183. As the user moves the mouse pointer 198, the transparent artboard 183 follows the mouse pointer 198. As a specific example, an upper left corner of the transparent artboard 183 may be aligned and follow the mouse pointer 198. Thus, a user controlling pointer 198 is able to drag and drop the newly created artboard 183 onto the display information canvas 200.

At step 220, during creation of the new artboard, the artboard generator 150 defines characteristics of the new artboard according to an active artboard present in the digital canvas 200. When the active artboard is artboard 182 displayed in the digital canvas 200, the artboard generator 150 defines the new artboard 183 as inheriting characteristics (such as shape, line width, formatting, edit settings, etc.) of the artboard 182. In particular, at step 230, the artboard generator 150 defines dimensions of the new artboard in accordance with dimensions of the active artboard present in the digital canvas. Thus, the new artboard 183 inherits the dimensions of the "active" second artboard 182.

In one embodiment, the artboard generator 150 keeps track of the different attributes associated with each artboard that appears on the digital canvas 200. Each of the displayed artboards can be of different sizes and display different content. As mentioned above, one of the artboards displayed on the digital canvas 200 can be an active artboard. Input of a command to create a new artboard prompts the artboard generator 150 to determine which one of the multiple artboards on the digital canvas 200 is active or which artboard has been selected. The artboard generator 150 accesses stored information to determine dimension attributes associated with the active artboard and creates the new artboard to have dimension attributes similar to the active artboard. In one embodiment, the newly created artboard is substantially a same size (or shape) as the active artboard on the digital canvas 200.

At step 240, in one configuration, the artboard generator 150 displays the new artboard as a blank artboard. For example, the artboard generator 150 displays the new artboard to have dimension attributes of the active artboard but without displaying any content. In other words, even though the new artboard 183 inherits characteristics from the "active" second artboard 182, the artboard generator 150 generates the new artboard 183 as a blank artboard with no retained content from previously active artboards—even though the most recently "active" second artboard 182 displays its own retained content 182-1. In this configuration, the artboard generator 150 does not create the new artboard 183 such that a version of the "active" second artboard's 182 retained content 182-1 is included in the new artboard 183. Note in other configurations, the user may select an option to retain content of the previous artboard such that creation of a new artboard copies content as well as creates the new artboard to be of substantially the same dimensions as the active artboard.

In accordance with a more specific embodiment, the artboard generator 150 maintains first dimension information specifying dimensions associated with a first artboard 181 displayed on the digital canvas 200. The artboard generator 150 maintains second dimension information specifying dimensions associated with a second artboard 182 displayed on the digital canvas.

In response to receiving a command to modify a size of the second artboard 182, the artboard generator 150 updates a size of the second artboard 182 in accordance with dimensions as specified by the command. Resizing can include input by a user dragging and dropping an edge of the artboard 182 so that artboard is larger or smaller. In response to resizing of the second artboard 182, the artboard generator 150 updates the dimension information for the second artboard 182 based on the dimensions as specified by the command. Thus, the artboard generator 150 can utilize the maintained dimension information to keep track of a current sizing of the different sized artboards on the digital canvas.

In response to receiving input to create a third artboard 183 for display on the digital canvas 200, the artboard generator 150 checks the digital canvas 200 to detect which of the artboards is active. Assume in this example that the artboard generator 150 detects that the second artboard 182 as mentioned above is the active artboard amongst multiple artboards displayed on the digital canvas 200.

In such circumstances, to create the third artboard 183, the artboard generator 150 accesses the stored dimension information associated with the second artboard 182 to identify a size associated with the second artboard 182 currently displayed on the digital canvas 200. Based on the accessed dimension information, the artboard generator 150 initiates creation of the third artboard 183 to be substantially a same size as the second artboard 182.

Accordingly, embodiments herein can include keeping track of dimensional information associated with each of multiple different sized artboards displayed on a digital canvas 200. Any of the displayed artboards can be selected as a template for creating a new artboard on the digital canvas 200. For example, a user can select one of multiple artboards displayed on the digital canvas 200 and thereafter initiate creation of a new artboard by inputting an appropriate command. As discussed above, the new artboard can be of substantially a same size as the selected artboard.

It is understood that FIG. 2 (as well as FIG. 4, FIG. 6, FIG. 8 and FIG. 9) illustrate various embodiments of the artboard generator 150. The rectangular elements in flowcharts 200, 400, 600, 800, 900 denote "processing blocks" and represent computer software instructions or groups of instructions upon a computer readable medium. Additionally, the processing blocks represent steps performed by hardware such as a computer, digital signal processor circuit, application specific integrated circuit (ASIC), etc.

Flowcharts 200, 400, 600, 800, 900 do not necessarily depict the syntax of any particular programming language. Rather, flowcharts 200, 400, 600, 800, 900 illustrate the functional information one of ordinary skill in the art requires to fabricate circuits or to generate computer software to perform the processing required in accordance with the present invention.

It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Figure 3:
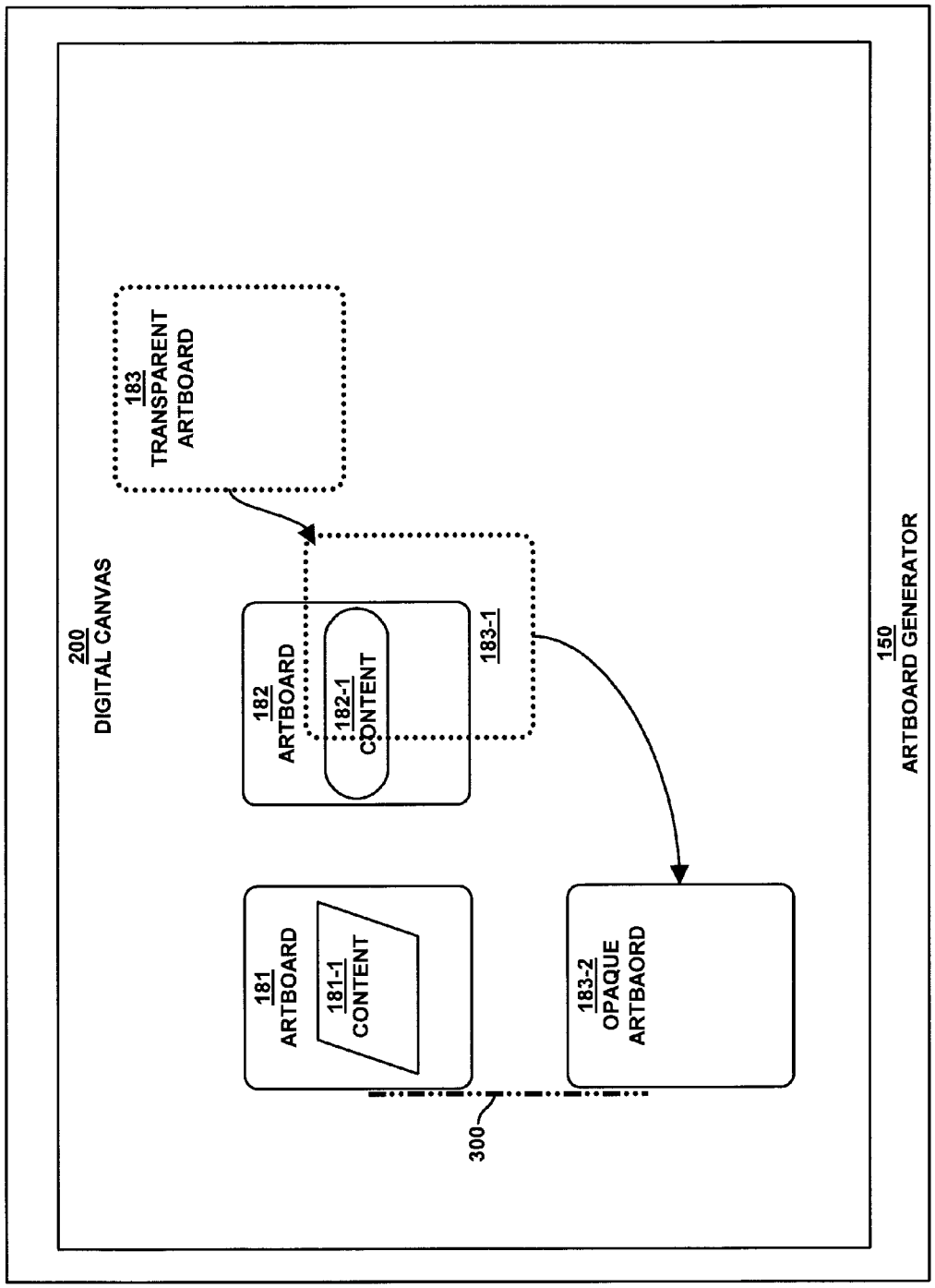
FIG. 3 is an example block diagram of an artboard generator converting a transparent rendition of a new artboard to an opaque rendition of the new artboard according to embodiments herein.

FIG. 3 is an example block diagram of an artboard generator 150 converting a transparent rendition of a new artboard 183 to an opaque rendition of the new artboard 183-2 according to embodiments herein. As illustrated in FIG. 3, the artboard generator 150 performs a placement operation with respect to the new artboard 183 as a user drags the new artboard 183 to a desired location in the digital canvas 200. After the user terminates dragging the new artboard 183 and selects a desired placement of the new artboard 183 such as below artboard 181, the artboard generator 150 completes performance of the placement operation and converts the transparent rendition of the new artboard 183 to an opaque rendition of the new artboard 183-2. Aspects of the artboard generator 150 illustrated in FIG. 3 are referenced below during discussion of FIG. 4 specifically and FIGS. 2, 6, 8 and 9 generally.

Figure 4:
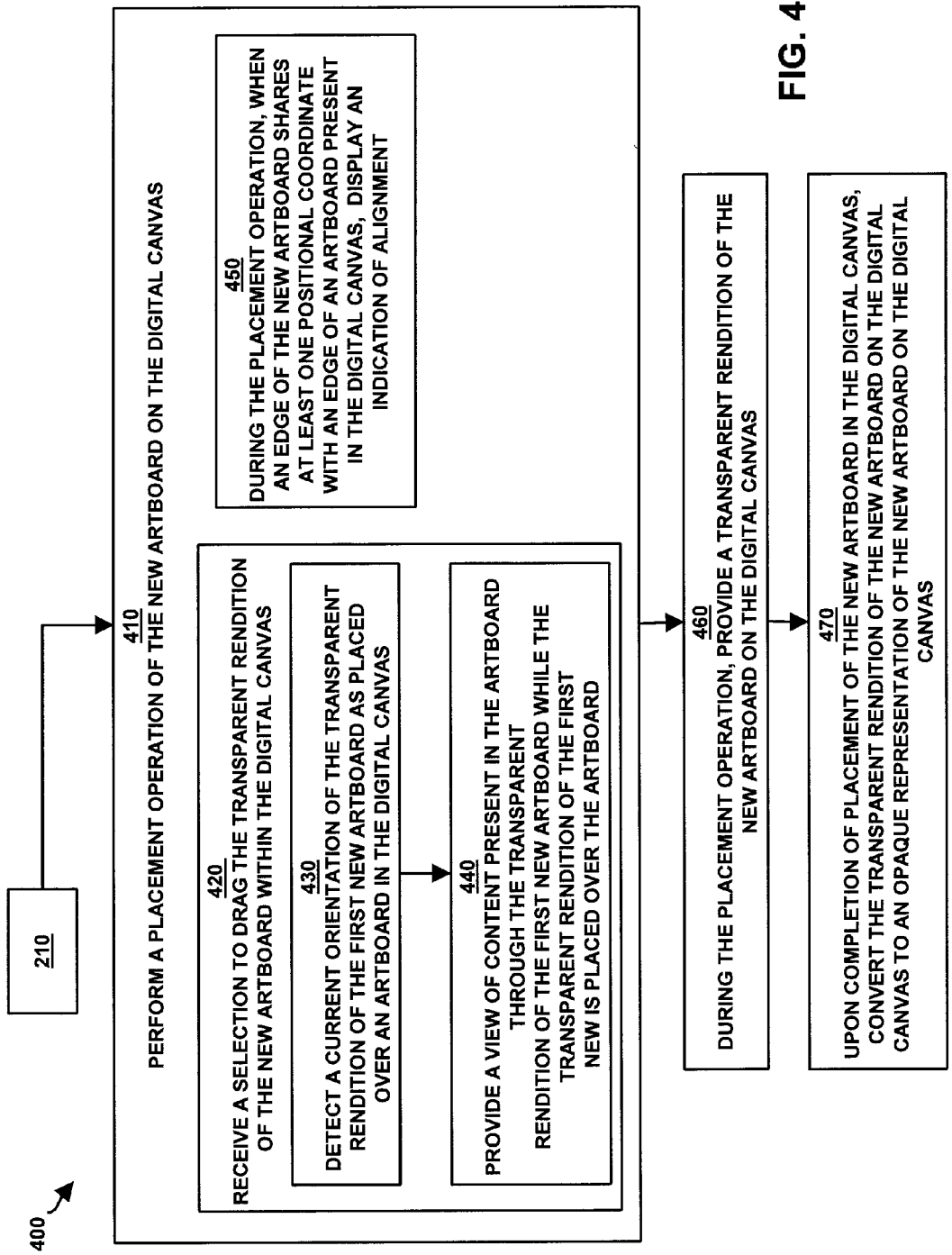
FIG. 4 is a flowchart of an example of processing steps performed by an artboard generator to convert a transparent rendition of a new artboard to an opaque rendition of the new artboard according to embodiments herein.

FIG. 4 is a flowchart 400 of an example of processing steps performed by an artboard generator 150 to convert a transparent rendition of a new artboard 183 to an opaque rendition of the new artboard 183-2 according to embodiments herein.

At step 410, the artboard generator 150 performs a placement operation of the new artboard 183 on the digital canvas 200. To perform the placement operation, at step 420, the artboard generator 150 receives a selection from the user to drag the transparent rendition of the new artboard 183 within the digital canvas 200 to any location desired by the user.

As the user drags the new artboard 183 and, in response, the artboard generator 150 repeatedly performs the placement operation—at step 430—the artboard generator 150 detects a current orientation and/or location of the transparent rendition of the new artboard 183-1 as placed over an existing artboard 182 in the digital canvas 200. While the transparent rendition of the new artboard 183-1 is placed over the existing artboard 182, the artboard generator 150 provides a view of the content 182-1 present in the artboard 182 through the transparent rendition of the first new artboard 183-1 (see step 440). Thus, the artboard generator 150 allows the user to see the existing artboard's 182 content 182-1 even though the transparent rendition of the new artboard 183-1 is currently placed over the artboard 182.

It is understood that, in one embodiment, the artboard generator 150 provides a slightly obscured, or "fuzzy," view of the content 182-1 through the transparent rendition of the new artboard 183-1 due to the shading of the transparent rendition of the new artboard 183. In other words, a user can see through the transparent artboard 183 to other artboards in the digital canvas 200 while the transparent artboard 183 is being dragged about digital canvas 200.

During the placement operation, in addition to providing a view of content 182-1 from an artboard 182 currently (or temporarily) beneath the transparent rendition of the new artboard 183-1, when an edge of the new artboard 183-2 shares a positional coordinate(s) with an edge of another artboard 181 present in the digital canvas 200, the artboard generator 150 displays an indication of alignment 300 between the new artboard 183-2 and the aligned artboard 181 (see step 450).

The artboard generator 150 provides a transparent rendition of the new artboard 183, 183-1 throughout performance of the placement operation, at step 460. However, at step 470, upon completion of placement of the new artboard 183, the artboard generator 150 converts the transparent rendition of the new artboard 183-1 to an opaque rendition of the new artboard 183-2 on the digital canvas 200. Completion of placement of the new artboard 183-2 includes terminating display of the indication of alignment 300.

Figure 5:
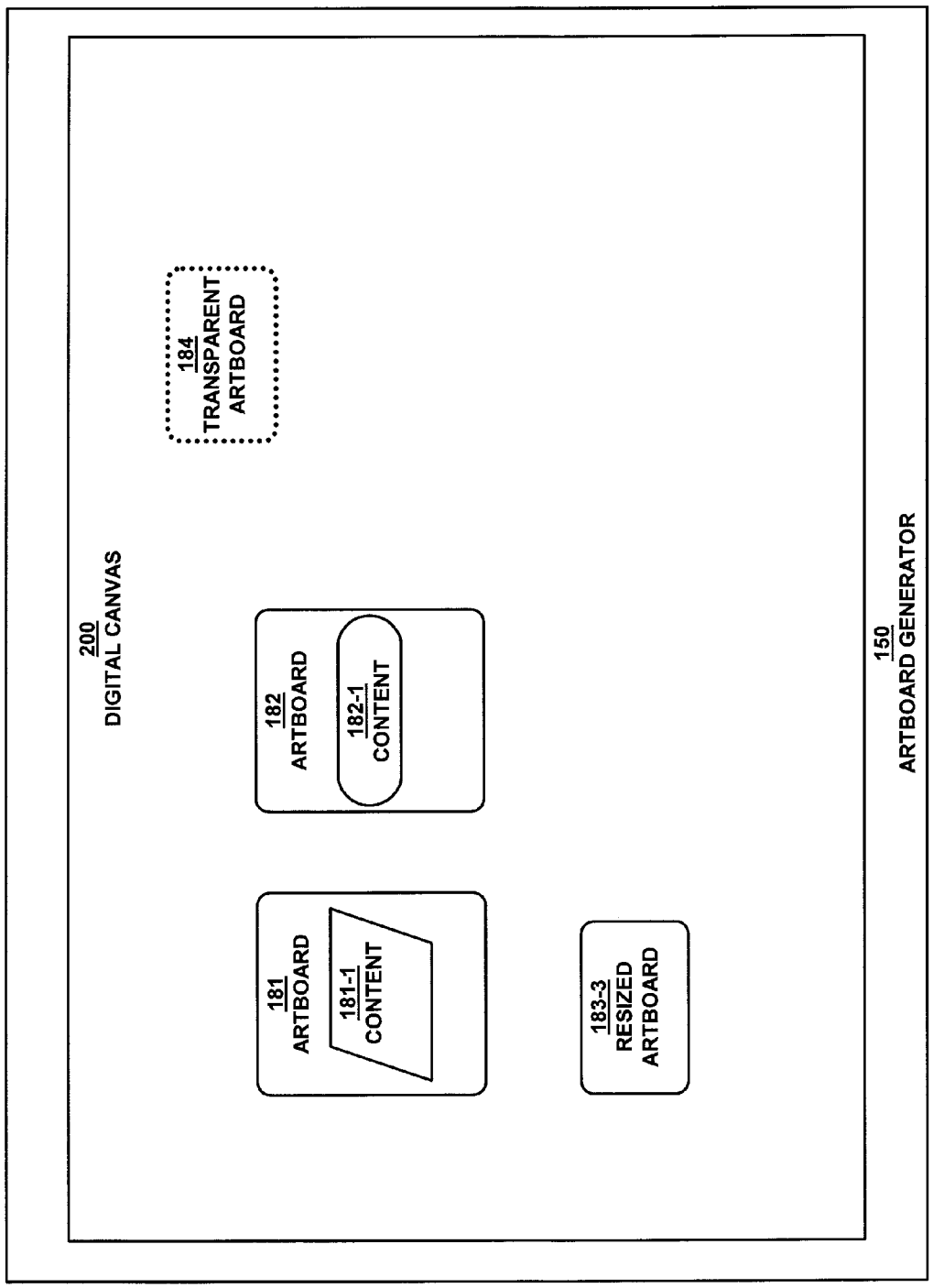
FIG. 5 is an example block diagram of an artboard generator detecting a selection of new dimensions for a new artboard according to embodiments herein.

FIG. 5 is an example block diagram of an artboard generator 150 detecting a selection of new dimensions for a new artboard 183-2 according to embodiments herein. As illustrated in FIG. 5, once the artboard generator 150 completes performance of the placement operation and displays the opaque rendition of the new artboard 183-2, the artboard generator 150 detects that the user selects new dimensions for the opaque rendition of the new artboard 183-2. The artboard generator 150 resizes the new artboard 183-2 according to the new dimensions to create a resized artboard 183-3.

In addition, the artboard generator 150 detects that the user selects an option to create a second new artboard 184. Since the resized artboard 183-3 is the active artboard in the digital canvas 200, the artboard generator 150 defines the second new artboard 184 such that the second new artboard 184 inherits the dimensions of the resized artboard 183-3 so that the newly created artboard is of substantially same size as an artboard currently displayed on the digital canvas. The aspects of the artboard generator 150 illustrated in FIG. 5 are referenced below during discussion of FIG. 6 specifically and FIGS. 2, 4, 8 and 9 generally.

Figure 6:
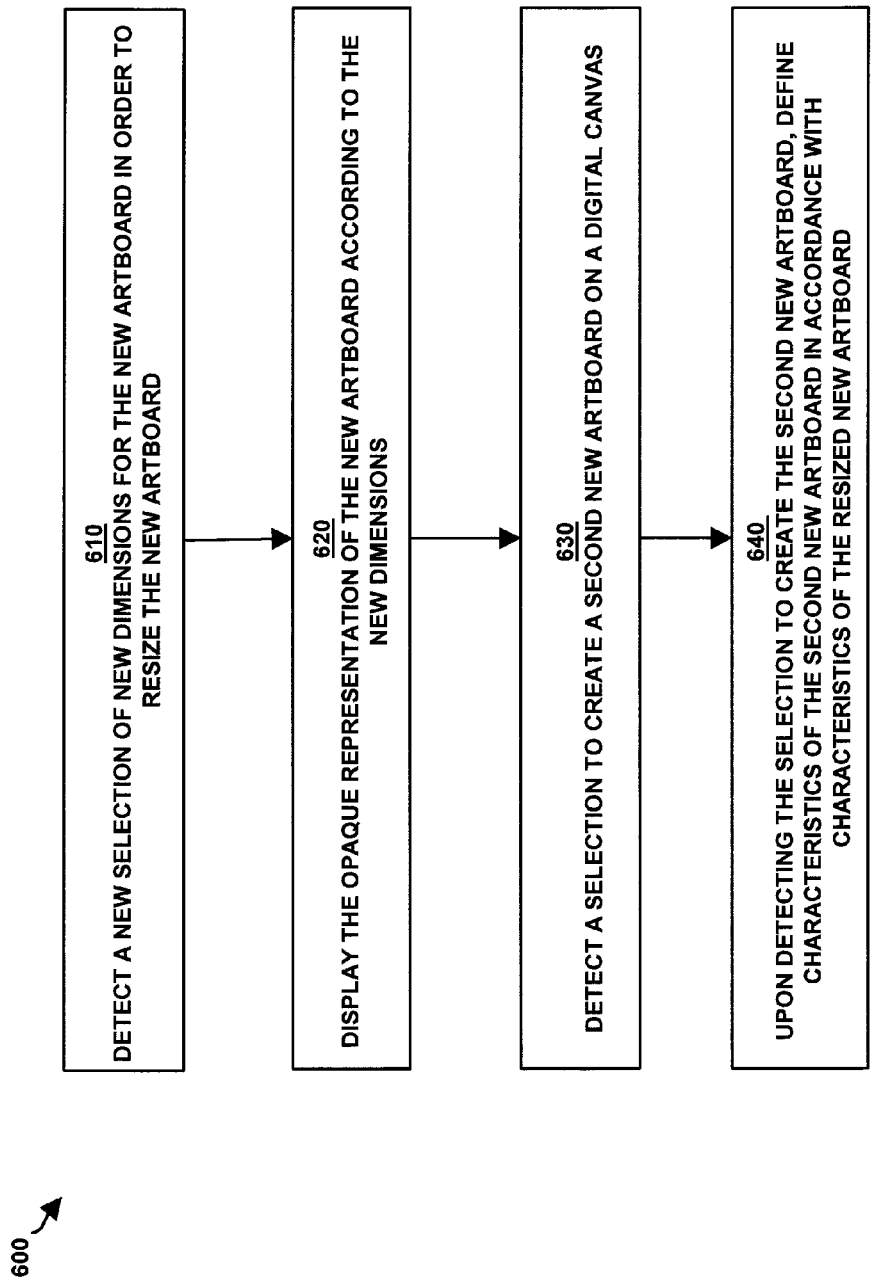
FIG. 6 is a flowchart of an example of processing steps performed by an artboard generator to detect a selection of new dimensions for a new artboard to embodiments herein.

FIG. 6 is a flowchart 600 of an example of processing steps performed by an artboard generator 150 to detect a selection of new dimensions for a new artboard 184 to embodiments herein.

At step 610, the artboard generator 150 detects a new selection of new dimensions for the new artboard 183-2 in order to resize the new artboard 183-2. The artboard generator 150 applies the new dimensions to the new artboard 183-2 to define a resized artboard 183-3. At step 620, the artboard generator 150 displays the opaque rendition of the new artboard 183-3 according to the new dimensions.

At step 630, the artboard generator 150 detects a selection to create a second new artboard on a digital canvas. The artboard generator 150 detects the user selecting an option to create a second new artboard 184 from a menu associated with the digital canvas 200. The artboard generator 150 creates the second new artboard 184 and displays a transparent rendition of the second new artboard 184 at an arbitrary location in the digital canvas 200 so that the user can select a placement of the second new artboard 184. As an alternative to an arbitrary placement of the artboard, the artboard generator 150 can initially display the new artboard in a vicinity of the pointer 198. The artboard generator 150 can reposition display of the new artboard based on movement of the pointer 198 so that the new artboard appears to be dragged by the pointer 198 about the digital canvas 200.

At step 640, upon detecting the selection to create the second new artboard 184, the artboard generator 150 defines characteristics of the second new artboard 184 in accordance with characteristics of the resized new artboard 183-3. Thus, when the artboard generator 150 defines the second new artboard 184, the second new artboard 184 inherits the dimensions the resized artboard 183-3—since the resized artboard 183-3 is the active artboard in the digital canvas 200.

Figure 7:
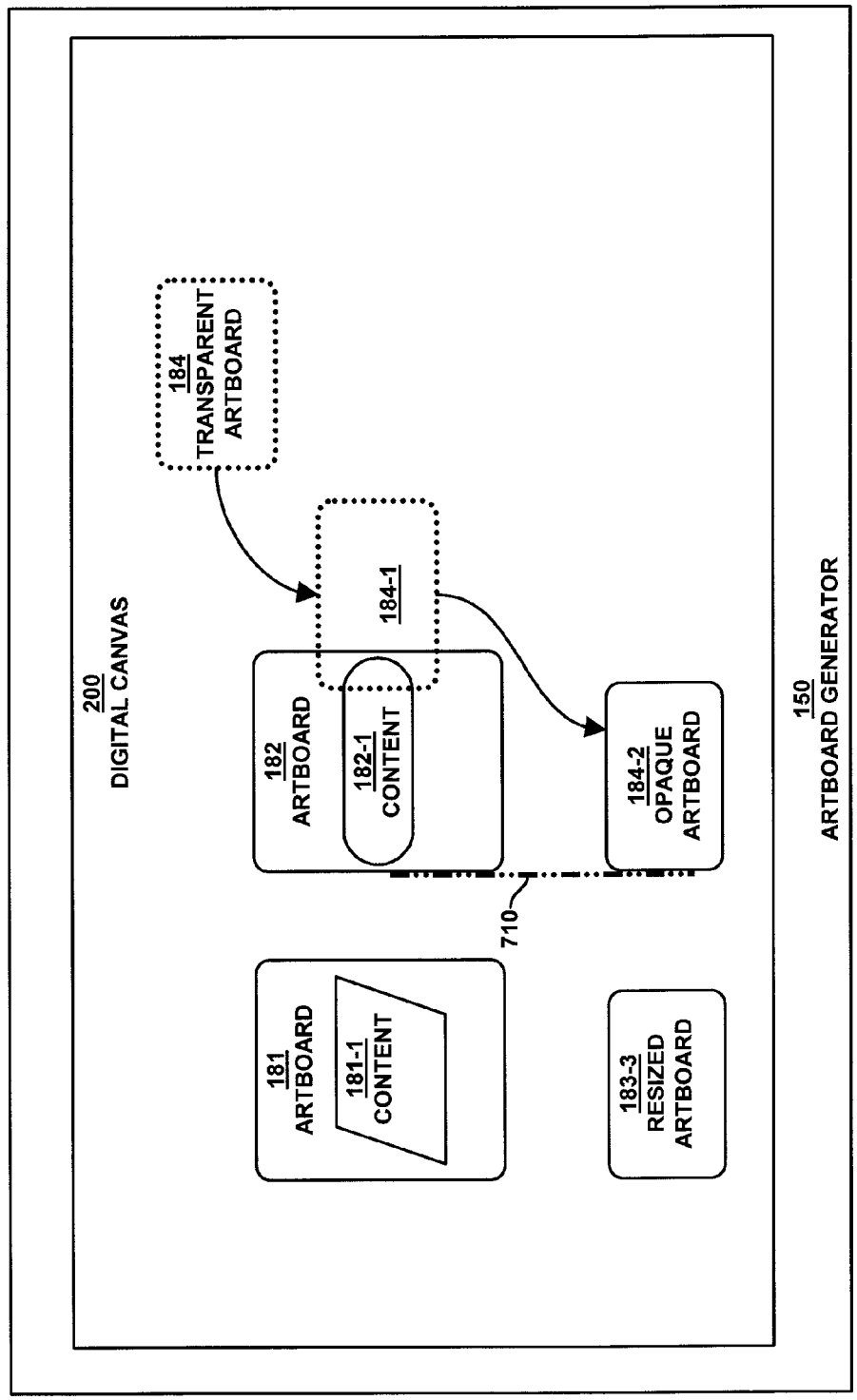
FIG. 7 is an example block diagram of an artboard generator converting a transparent rendition of a second new artboard to an opaque rendition of the second new artboard according to embodiments herein.

FIG. 7 is an example block diagram of an artboard generator converting a transparent rendition of a second new artboard to an opaque rendition of the second new artboard according to embodiments herein. As illustrated in FIG. 7, the artboard generator 150 performs a placement operation with respect to a transparent rendition of second new artboard 184 as a user drags the transparent rendition of second new artboard 184 to a desired location in the digital canvas 200.

Once the user terminates dragging the transparent rendition of second new artboard 184 and selects a desired placement of the new artboard 184, the artboard generator 150 completes performance of the placement operation, assigns a location to the transparent rendition of second new artboard 184 such that an edge of the transparent rendition of second new artboard 184 is alignment with an edge of another artboard in digital canvas, and converts the transparent rendition of the new artboard 184 to an opaque rendition of the new artboard 184-2. Aspects of the artboard generator 150 illustrated in FIG. 7 are referenced below during discussion of FIG. 8 specifically and FIGS. 2, 4, 6 and 9 generally.

Figure 8:
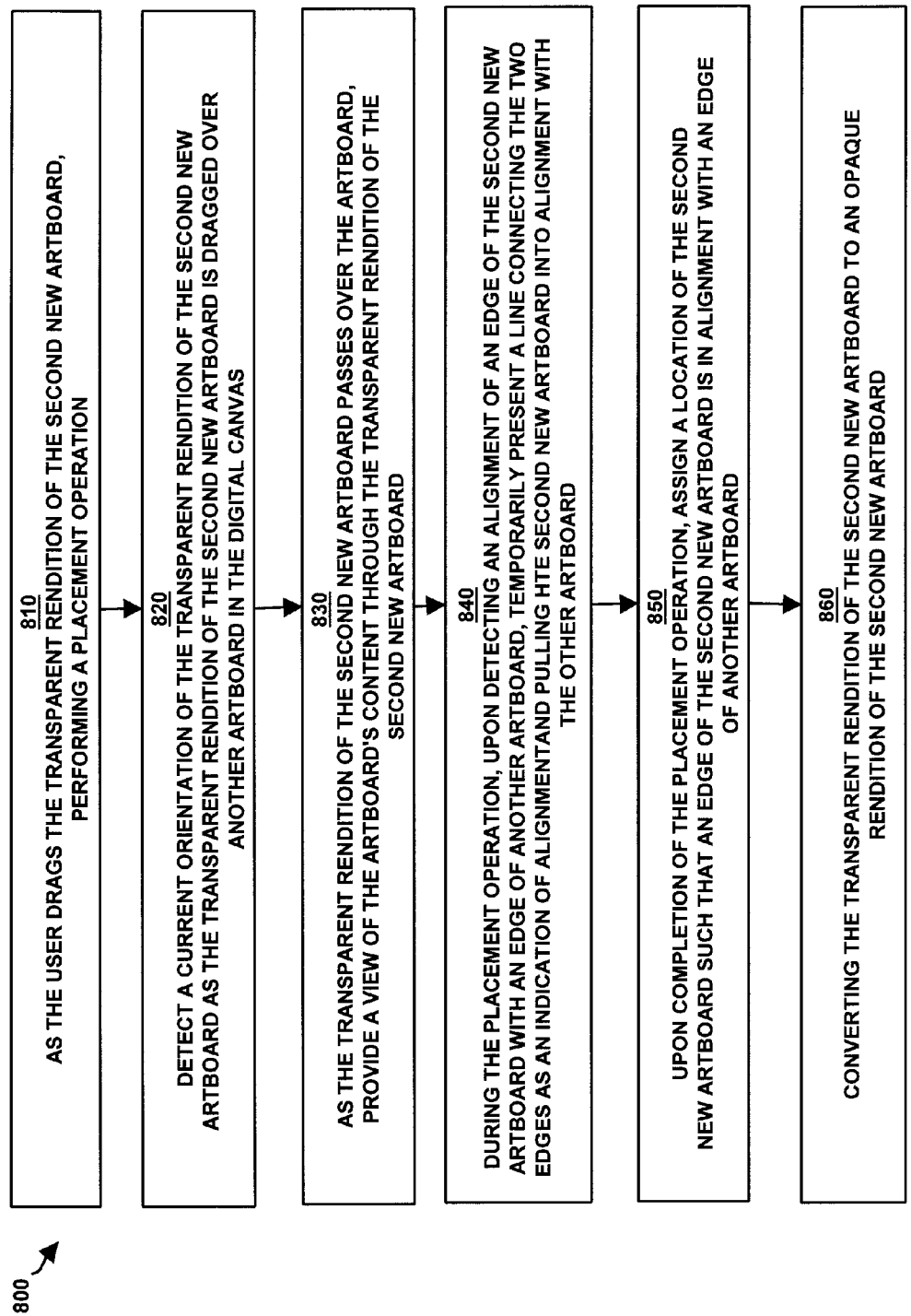
FIG. 8 is a flowchart of an example of processing steps performed by an artboard generator to convert a transparent rendition of a second new artboard to an opaque rendition of the second new artboard according to embodiments herein.

FIG. 8 is a flowchart 800 of an example of processing steps performed by an artboard generator 150 to convert a transparent rendition of a second new artboard 184 to an opaque rendition of the second new artboard 184-2 according to embodiments herein.

At step 810, as the user drags the transparent rendition of the second new artboard 184, the artboard generator 150 performs a placement operation in order to present the transparent rendition of the second new artboard 184 at a location in the digital canvas 200 selected by the user.

During repeatedly performance of the placement operation, at step 820, the artboard generator 150 detects a current orientation and/or location of the transparent rendition of the second new artboard 184-1 as the transparent rendition of the second new artboard 184-1 is dragged over another artboard 182 in the digital canvas 200.

At step 830, as the transparent rendition of the second new artboard 184-1 is dragged over the artboard 182 such that the transparent rendition of the second new artboard 184-1 passes over the artboard 182, the artboard generator 150 provides a view of the artboard's 182 content 182-1 through the transparent rendition of the second new artboard 184-1.

At step 840, during the placement operation, upon detecting an alignment of an edge of the second new artboard 184-2 with an edge of another artboard 182, the artboard generator 150 temporarily presents a line 710 connecting the two edges as an indication of alignment and pulls the new artboard into alignment with the other artboard present in the digital canvas.

At step 850, upon completion of the placement operation, the artboard generator 150 assigns a location of the second new artboard 184-2 such that an edge of the second new artboard 184-2 is in alignment with an edge of another artboard 182. For example, the artboard generator 150 detects when the user places the second new artboard 184-2 proximate to the position described by the line 710 (i.e. the indication of alignment). The artboard generator 150 pulls the second new artboard 184-2 towards the position described by the line 710 such that second new artboard 184-2 "snaps" into a location on the digital canvas 200 that is in alignment with the other artboard 182.

At step 860, the artboard generator 150 converts the transparent rendition of the second new artboard to an opaque rendition of the second new artboard 184-2.

Figure 9:
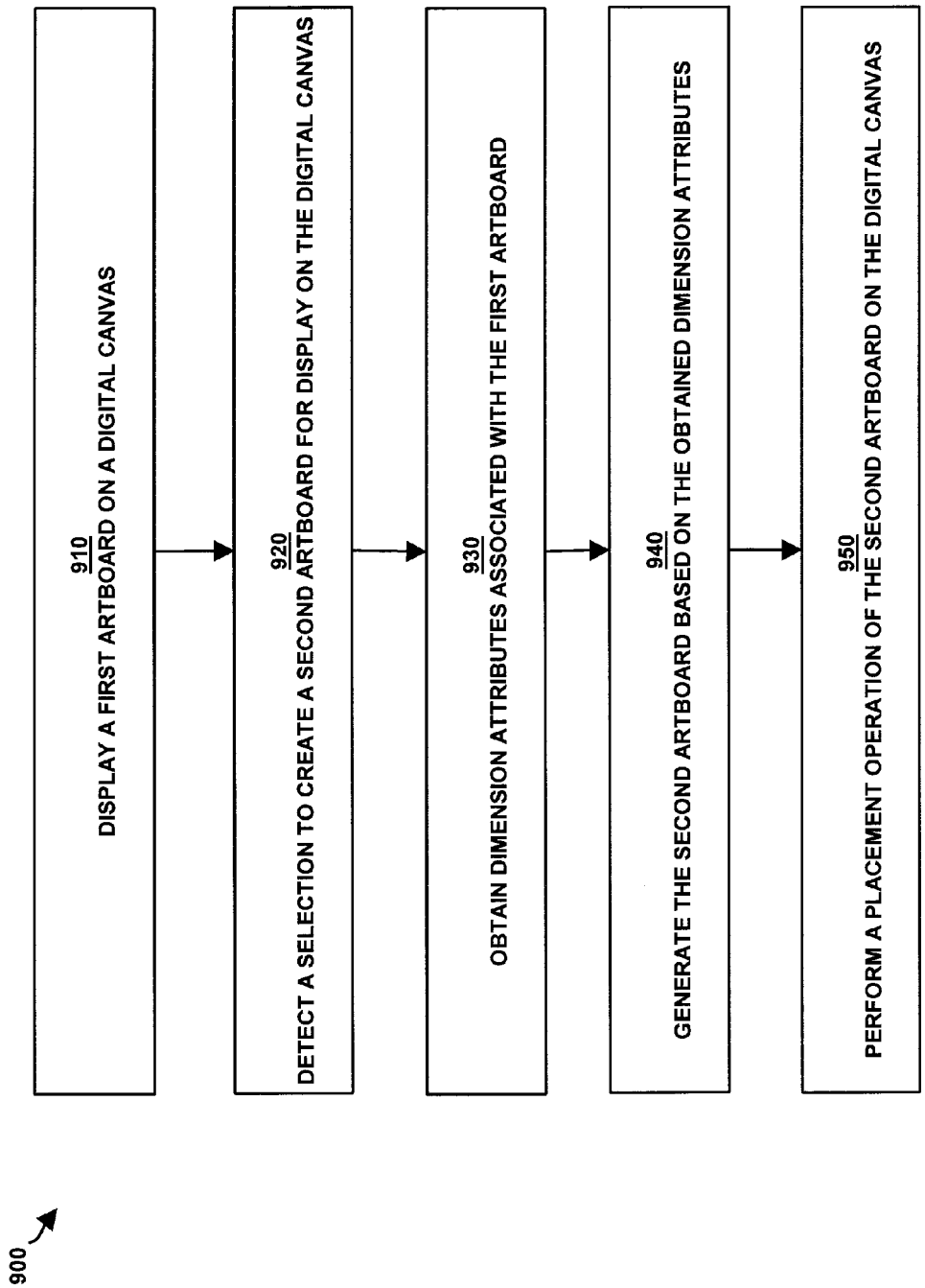
FIG. 9 is a flowchart of an example of processing steps performed by an artboard generator to perform a placement operation of a second artboard on a digital canvas according to embodiments herein.

FIG. 9 is a flowchart 900 of an example of processing steps performed by an artboard generator 150 to perform a placement operation of a second artboard on a digital canvas according to embodiments herein.

At step 910, the artboard generator 150 displays a first artboard 182 on a digital canvas 200.

At step 920, the artboard generator 150 detects a selection to create a second artboard 183 for display on the digital canvas 200. For example, the artboard generator 150 can detect a user clicking on a "new artboard" menu option 199 via a user-controlled prompt.

At step 930, the artboard generator 150 obtains dimension attributes associated with the first artboard 182.

At step 940, the artboard generator 150 generates the second artboard 183 based on the obtained dimension attributes.

At step 950, the artboard generator 150 performs a placement operation of the second artboard 183 on the digital canvas (as shown in FIG. 3).

FIG. 10 is an example block diagram illustrating an architecture of a computer system 110 that executes, runs, interprets, operates or otherwise performs an artboard generator application 150-1 and/or artboard generator process 150-2 (e.g. an executing version of an artboard generator 150 as controlled or configured by user 108) according to embodiments herein.

Note that the computer system 110 may be any type of computerized device such as a personal computer, a client computer system, workstation, portable computing device, console, laptop, network terminal, etc. This list is not exhaustive and is provided as an example of different possible embodiments.

In addition to a single computer embodiment, computer system 110 can include any number of computer systems in a network environment to carry the embodiments as described herein.

As shown in the present example, the computer system 110 includes an interconnection mechanism 111 such as a data bus, motherboard or other circuitry that couples a memory system 112, a processor 113, an input/output interface 114, and a display 130. If so configured, the display can be used to present a graphical user interface of the artboard generator 150 to user 108. An input device 116 (e.g., one or more user/developer controlled devices such as a keyboard, mouse, touch pad, etc.) couples to the computer system 110 and processor 113 through an input/output (I/O) interface 114. The computer system 110 can be a client system and/or a server system. As mentioned above, depending on the embodiment, the artboard generator application 150-1 and/or the artboard generator process 150-2 can be distributed and executed in multiple nodes in a computer network environment or performed locally on a single computer.

During operation of the computer system 110, the processor 113 accesses the memory system 112 via the interconnect 111 in order to launch, run, execute, interpret or otherwise perform the logic instructions of the artboard generator application 150-1. Execution of the artboard generator application 150-1 in this manner produces the artboard generator process 150-2. In other words, the artboard generator process 150-2 represents one or more portions or runtime instances of the artboard generator application 150-1 (or the entire application 150-1) performing or executing within or upon the processor 113 in the computerized device 110 at runtime.

The artboard generator application 150-1 may be stored on a computer readable medium (such as a floppy disk), hard disk, electronic, magnetic, optical, or other computer readable medium. It is understood that embodiments and techniques discussed herein are well suited for other applications as well.

Those skilled in the art will understand that the computer system 110 may include other processes and/or software and hardware components, such as an operating system. Display 130 need not be coupled directly to computer system 110. For example, the artboard generator application 150-1 can be executed on a remotely accessible computerized device via the communication interface 115.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a processor", or "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application.

References to a network, unless provided otherwise, may include one or more intranets and/or the internet, as well as a virtual network. References herein to microprocessor instructions or microprocessor-executable instructions, in accordance with the above, may be understood to include programmable hardware.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A computer-implemented method, comprising:
   displaying, by a processor, a first artboard associated with a project on a digital canvas, wherein the digital canvas comprises a window within a graphical user interface for modifying the project;
   determining, by the processor, that content within the first artboard has been edited more recently than content within any other artboard of multiple artboards displayed on the digital canvas;
   identifying, by the processor, the first artboard as an active artboard in response to determining that the content within the first artboard has been edited more recently than any other artboard;
   detecting, by the processor, a selection to create a second artboard associated with the first artboard for display on the digital canvas;
   obtaining, by the processor, dimension attributes associated with the first artboard based on identifying the first artboard as the active artboard;
   generating, by the processor, the second artboard associated with the first artboard based on the obtained dimension attributes; and
   performing, by the processor, a placement operation of the second artboard associated with the first artboard on the digital canvas.

2. The computer-implemented method as in claim 1, further comprising:
   during the placement operation, displaying a transparent rendition of the second artboard on the digital canvas; and
   upon completion of placement of the second artboard on the digital canvas, converting the transparent rendition of the second artboard on the digital canvas to an opaque rendition of the second artboard.

3. The computer-implemented method as in claim 1, wherein generating the second artboard further comprises:
   displaying the second artboard to be substantially a same size as the first artboard.

4. The computer-implemented method as in claim 3, further comprising:
   displaying content in the first artboard; and
   initiating creation of the second artboard as a blank artboard.

5. The computer-implemented method as in claim 1, further comprising:
   detecting a selection of new dimensions for the second artboard; and
   resizing the second artboard according to the new dimensions.

6. The computer-implemented method as in claim 5, further comprising:
   detecting a selection to create a third artboard associated with the first artboard for display on the digital canvas;
   upon detecting the selection to create the third artboard, defining characteristics of the third artboard in accordance with characteristics of the resized second artboard;
   performing an additional placement operation of the third artboard on the digital canvas;
   during the placement operation of the third artboard, displaying a transparent rendition of the third artboard on the digital canvas; and
   upon completion of placement of the third artboard at a specific location on the digital canvas, converting the transparent rendition of the third artboard on the digital canvas to an opaque rendition of the third artboard.

7. The computer-implemented method as in claim 2, wherein performing the placement operation of the second artboard on the digital canvas includes:
   receiving input to drag the transparent rendition of the second artboard based on movement of a pointer with respect to the digital canvas.

8. The computer-implemented method as in claim 2, wherein performing the placement operation of the second artboard on the digital canvas includes:
   during the placement operation:
   detecting movement of the transparent rendition of the second artboard over the first artboard in the digital canvas; and
   while the second artboard is over the first artboard, providing a view of content in the first artboard through the transparent rendition of the second artboard.

9. The computer-implemented method as in claim 1, further comprising:
   wherein performing the placement operation of the second artboard on the digital canvas includes:
   during the placement operation, when an edge of the second artboard shares at least one positional coordinate with an edge of the first artboard:
   displaying an indication of alignment between the edge of the second artboard and the edge of the first artboard; and
   pulling the second artboard into alignment with the first artboard.

10. The computer-implemented method as in claim 9, further comprising:
    upon completion of the placement operation, terminating display of the indication of alignment.

11. The computer-implemented method as in claim 9, wherein displaying the indication of alignment includes:
    displaying a temporary line connecting the edge of the second artboard and the edge of the first artboard.

12. The computer-implemented method as in claim 1, further comprising:
    detecting a selection of new dimension attributes for the second artboard, the new dimension attributes being different than the obtained dimension attributes;
    updating display of the second artboard in accordance with the new dimension attributes;
    detecting a selection to create a third artboard associated with the first artboard on the digital canvas; and
    displaying a rendition of the third artboard, the rendition of the third artboard being sized in accordance with the new dimension attributes such that the third artboard is substantially a same size as the second artboard.

13. The computer-implemented method as in claim 1, further comprising: maintaining first dimension information specifying dimensions associated with the first artboard;
    maintaining second dimension information specifying dimensions associated with the second artboard;
    receiving a command to modify a size of the second artboard;
    updating a size of the second artboard in accordance with dimensions as specified by the command; and
    updating the second dimension information based on the dimensions as specified by the command.

14. A computer program product including a non-transitory computer-storage medium having instructions stored thereon for processing data information, such that the instructions, when carried out by a processing device, enable the processing device to perform operations of:

displaying a first artboard associated with a project on a digital canvas, wherein the digital canvas comprises a window within a graphical user interface for modifying the project;

determining that content within the first artboard has been edited more recently than content within any other artboard of multiple artboards displayed on the digital canvas;

identifying the first artboard as an active artboard in response to determining that the content within the first artboard has been edited more recently than any other artboard;

detecting a selection to create a second artboard associated with the first artboard for display on the digital canvas;

based on identifying the first artboard as the active artboard, obtaining dimension attributes associated with the first artboard;

generating the second artboard associated with the first artboard based on the obtained dimension attributes; and performing a placement operation of the second artboard associated with the first artboard on the digital canvas.

15. The computer program product as in claim 14, further comprising instructions enabling the processing device to perform the additional operations of:

during the placement operation, displaying a transparent rendition of the second artboard on the digital canvas; and upon completion of placement of the second artboard on the digital canvas, converting the transparent rendition of the second artboard on the digital canvas to an opaque rendition of the second artboard.

16. The computer program product as in claim 14, wherein the operations of generating the second artboard further comprise operations of:

displaying the second artboard to be substantially a same size as the first artboard.

17. The computer program product as in claim 16, further comprising instructions enabling the processing device to perform the additional operations of:

displaying content in the first artboard; and initiating creation of the second artboard as a blank artboard.

18. The computer program product as in claim 14, further comprising instructions enabling the processing device to perform the additional operations of:

detecting a selection of new dimensions for the second artboard; and resizing the second artboard according to the new dimensions.

19. The computer program product as in claim 18, further comprising instructions enabling the processing device to perform the additional operations of:

detecting a selection to create a third artboard associated with the first artboard for display on the digital canvas;

upon detecting the selection to create the third artboard, defining characteristics of the third artboard in accordance with characteristics of the resized second artboard;

performing an additional placement operation of the third artboard on the digital canvas;

during the placement operation of the third artboard, displaying a transparent rendition of the third artboard on the digital canvas; and upon completion of placement of the third artboard at a specific location on the digital canvas, converting the transparent rendition of the third artboard on the digital canvas to an opaque rendition of the third artboard.

20. The computer program product as in claim 15, wherein the operations of performing the placement operation of the second artboard on the digital canvas include operations of:

receiving input to drag the transparent rendition of the second artboard based on movement of a pointer with respect to the digital canvas.

21. The computer program product as in claim 15, wherein the operations of performing the placement operation of the second artboard on the digital canvas include operations of:

during the placement operation:

detecting movement of the transparent rendition of the second artboard over the first artboard in the digital canvas; and while the second artboard is over the first artboard, providing a view of content in the first artboard through the transparent rendition of the second artboard.

22. The computer program product as in claim 14, further comprising instructions enabling the processing device to perform the additional operations of:

wherein the operations of performing the placement operation of the second artboard on the digital canvas includes operations of:

during the placement operation, when an edge of the second artboard shares at least one positional coordinate with an edge of the first artboard:

displaying an indication of alignment between the edge of the second artboard and the edge of the first artboard; and pulling the second artboard into alignment with the first artboard.

23. The computer program product as in claim 22, further comprising instructions enabling the processing device to perform the additional operations of:

terminating display of the indication of alignment upon completion of the placement operation.

24. The computer program product as in claim 22, wherein the operations of displaying the indication of alignment include operations of:

displaying a temporary line connecting the edge of the second artboard and the edge of the first artboard.

25. The computer program product as in claim 14, further comprising instructions enabling the processing device to perform the additional operations of:

detecting a selection of new dimension attributes for the second artboard, the new dimension attributes being different than the obtained dimension attributes;

updating display of the second artboard in accordance with the new dimension attributes;

detecting a selection to create a third artboard associated with the first artboard on the digital canvas; and displaying a rendition of the third artboard, the rendition of the third artboard being sized in accordance with the new dimension attributes such that the third artboard is substantially a same size as the second artboard.

26. A computer system comprising:

a processor;

a memory unit that stores instructions associated with an application executed by the processor; and an interconnect coupling the processor and the memory unit, enabling the computer system to execute the application and perform operations of:

displaying a first artboard associated with a project on a digital canvas, wherein the digital canvas comprises a window within a graphical user interface for modifying the project;

determining that content within the first artboard has been edited more recently than content within any other artboard of multiple artboards displayed on the digital canvas;

identifying the first artboard as an active artboard in response to determining that the content within the first artboard has been edited more recently than any other artboard;

detecting a selection to create a second artboard associated with the project for display on the digital canvas;

obtaining dimension attributes associated with the first artboard based on identifying the first artboard as the active artboard; and generating the second artboard associated with the first artboard based on the obtained dimension attributes; and performing a placement operation of the second artboard associated with the first artboard on the digital canvas.

27. The method of claim 1, wherein determining that content within the first artboard has been edited more recently comprises determining that at least one of image content or text content within the first artboard has been edited in response to receiving an input within the first artboard.

28. The method of claim 1, wherein performing the placement operation of the second artboard on the digital canvas comprises:

detecting a position of a user-controlled prompt in the digital canvas; and positioning second artboard on the digital canvas based on the position of the user-controlled prompt.

29. The method of claim 1, wherein detecting the selection to create the second artboard associated comprises:

detecting a keyboard input corresponding to a modifier key, and detecting an input in the digital canvas by a user-controlled prompt; and wherein generating the second artboard is performed based on the detection of both the keyboard input and the input in the digital canvas by the user-controlled prompt.

* * * * *